(12) United States Patent
Davis et al.

(10) Patent No.: US 7,110,778 B2
(45) Date of Patent: Sep. 19, 2006

(54) REMOTE TELEMETRY DEVICE

(76) Inventors: Samuel D. Davis, 790 Bramlett Shoals Rd., Lawrenceville, GA (US) 30045; Reiner J. Gerdes, 812 Oakdale Rd., Atlanta, GA (US) 30307; Mark E. Johnson, 5048 Seabrook Pl., Stone Mountain, GA (US) 30087

( * ) Notice: Subject to any disclaimer, the term of this patent is extended or adjusted under 35 U.S.C. 154(b) by 322 days.

(21) Appl. No.: 10/630,050

(22) Filed: Jul. 30, 2003

(65) Prior Publication Data

US 2006/0033639 A1 Feb. 16, 2006

(51) Int. Cl.
*H04Q 7/20* (2006.01)
*H04Q 7/38* (2006.01)
*H04Q 7/32* (2006.01)

(52) U.S. Cl. .............. 455/456.1; 455/405; 455/403; 455/420; 455/419; 455/426.1; 455/426.2; 455/466; 340/870.01; 340/870.02; 379/102.01; 379/106.01; 379/106.03; 379/106.11; 379/106.07

(58) Field of Classification Search .............. 455/3.03, 455/3.04, 401, 403, 405, 412.1, 422.1, 426.1, 455/426.2, 445, 454, 500, 517, 550.1, 556.1, 455/557, 90.3, 418, 419, 420, 466, 414.1, 455/414.4; 340/870.01, 870.02; 379/102.01, 379/106.07, 106.09, 106.11, 106.03
See application file for complete search history.

(56) References Cited

U.S. PATENT DOCUMENTS

| | | | |
|---|---|---|---|
| 5,655,011 A | * | 8/1997 | Brown .................... 379/93.06 |
| 5,719,918 A | | 2/1998 | Serbetciouglu et al. ....... 379/58 |
| 5,897,607 A | | 4/1999 | Jenney et al. ................ 702/62 |
| 6,069,571 A | | 5/2000 | Tell ...................... 340/870.02 |
| 6,150,955 A | | 11/2000 | Tracy et al. ........... 340/870.02 |
| 6,369,719 B1 | | 4/2002 | Tracy et al. ........... 340/870.02 |
| 6,577,245 B1 | * | 6/2003 | Hammond ............. 340/870.02 |
| 6,867,707 B1 | * | 3/2005 | Kelley et al. .......... 340/870.02 |
| 2001/0038343 A1 | * | 11/2001 | Meyer et al. .......... 340/870.02 |
| 2003/0058129 A1 | * | 3/2003 | Kim ..................... 340/870.02 |

OTHER PUBLICATIONS

Web Site: http://www.transtelgroup.com; TransTel Group, Inc. (2 pages); TransTel Group Products (RTS Series) (1 page); TransTel Group Products RTS-Datapak (5 pages) Copyright 2002.

(Continued)

*Primary Examiner*—Keith Ferguson
(74) *Attorney, Agent, or Firm*—Harold L. Marquis; George M Thomas; James W. Kayden

(57) ABSTRACT

The systems and methods disclosed herein relate to digital data communication systems, and more particularly, the systems and methods relate to systems and methods for facilitating digital communication between a modem equipped meter and a central data acquisition system. In one example, the system has the central data acquisition system, a first telemetry device that utilizes a modem for data communication, and a second telemetry device with a processor for communicating with the first telemetry device, and a digital cellular radio for communicating with the processor. The processor relays digital meter data from the first telemetry device to the digital cellular radio and the digital cellular radio transmits the digital meter data to the central data acquisition system. This system allows the utility company to transmit the reading of utility consumption by a consumer without the use of telephone lines.

8 Claims, 6 Drawing Sheets

OTHER PUBLICATIONS

Brochure: RTS-DataPak (Remote Telemetry System) (2 pages) Printed Feb. 1997.
Web Site: http://www.hut.fi/Misc/Electronics/circuits/telephone_ringer.html; Telephone Ringing Circuits (7 Pages) Copyright Tomi Engdahl 1997, 2000.
Web Site: http://margo.student.utwente.nl/el/phone/dtmf/htm; DTMF FAQ—Telephone Tone Dialing Chips V1.20 (13 pages).
Web Site: http://whatis.techtarget.com/definition/0,,sid9_gci213237,00.html; UART definition (2 pages) Copyright 2000-2003, Tech Target.

* cited by examiner

REMOTE TELEMETRY DEVICE

TECHNICAL FIELD

This invention relates to digital data communication systems, and more particularly, the invention relates to systems and methods for facilitating digital communication between a modem equipped meter and a central data acquisition system, wherein a remote telemetry device has a processor for communicating with the modem of the meter, and a digital cellular radio for communicating with the processor, wherein the processor relays the digital meter data from the modem of the meter to the digital cellular radio which transmits the digital meter data to a cell tower which in turn transmits the digital meter data to the central data acquisition system.

BACKGROUND OF THE INVENTION

Utility companies have developed meters equipped with modems in order to transmit readings of consumed resources, e.g., gas, water, or electricity, via telephone lines. The utility companies have a substantial investment in this technology. However, a disadvantage of this technology is the lack of availability of telephone lines in many areas and high installation cost to link the modem equipped meter to a data acquisition system of utility companies.

From the above, it can be appreciated that it would be desirable to have a system and method for facilitating digital communication between the modem equipped meter and the utility data acquisition system without the use of telephone lines to transmit readings to the data acquisition system.

SUMMARY OF THE INVENTION

With the expansion of cities and development of new subdivisions, utility companies would like to continue to use their modem equipped devices or meters, e.g., power meter, water meter, flow meter, gas meter, and other types of measurement devices. However, in order to cut down on expenses, the utility companies would rather not invest in telephone lines, the maintenance of telephone lines, and other related costs of telephone lines to communicate data from the modem equipped device to a data acquisition system. Systems and methods for facilitating digital communication between the modem equipped device and the central data acquisition system have been invented. The systems and methods use digital technology, such as digital cellular radio, digital networks, digital communication techniques (e.g., Time Division Multiple Access (TDMA), Code Division Multiple Access (CDMA), Global System for Mobile Communications (GSM), etc). The systems and methods can establish a bi-directional communication pathway that relays data between the modem equipped meter and the central data acquisition system.

In one embodiment, the system has the central data acquisition system, a first telemetry device that utilizes a modem for data communication, and a second telemetry device with a processor for communicating with the first telemetry device, and a digital cellular radio for communicating with the processor. The processor relays digital meter data from the first telemetry device to the digital cellular radio and the digital cellular radio transmits the digital meter data to the central data acquisition system. This system allows the utility company to transmit the reading of utility consumption by a consumer without the use of telephone lines. The system can use current digital cellular communication technology, such TDMA, CDMA, GSM, etc., and the modem inside the utility device to facilitate digital data communication between the modem equipped device and the central data acquisition system.

In another embodiment, a method for facilitating digital communication between a modem equipped device, such as a meter, and a central data acquisition system comprising the steps of detecting whether the modem equipped meter is off-hook, establishing a bi-directional communication pathway that relays data between the modem equipped meter and the central data acquisition system, and terminating the pathway by either the modem equipped meter or the central data acquisition system. The method uses the modem inside the utility meter to communicate the reading from the meter to the data acquisition system. The method further takes advantage of the cellular communication technology to relay digital data of utility readings from the meter without the use of a land line telephone line.

BRIEF DESCRIPTION OF THE DRAWINGS

The disclosed systems and methods can be better understood with reference to the following drawings. The components in the drawings are not necessarily to scale.

DETAILED DESCRIPTION OF THE PREFERRED EMBODIMENT

Disclosed herein are systems and methods in which utility readings within a modem equipped meter or device can be relayed to a central data acquisition system via a digital cellular radio and a cellular network. In particular, the digital data communication between the modem equipped device and the central data acquisition system can be achieved using digital cellular technology, e.g., digital cellular radio, digital cellular networks, and digital cellular communication technology, such as Time Division Multiple Access (TDMA), Code Division Multiple Access (CDMA), Global System for Mobile Communications (GSM), etc. Examples of such systems are first discussed with reference to the figures. Although the systems are described in detail, they are provided for purposes of illustration only and various modifications are feasible. After the examples of such systems have been described, examples of operation of the systems are provided disclosing the manner in which the digital data, e.g., utility readings of the modem equipped device or meter, are relayed from the modem equipped device to the central data acquisition system.

Figure 1:
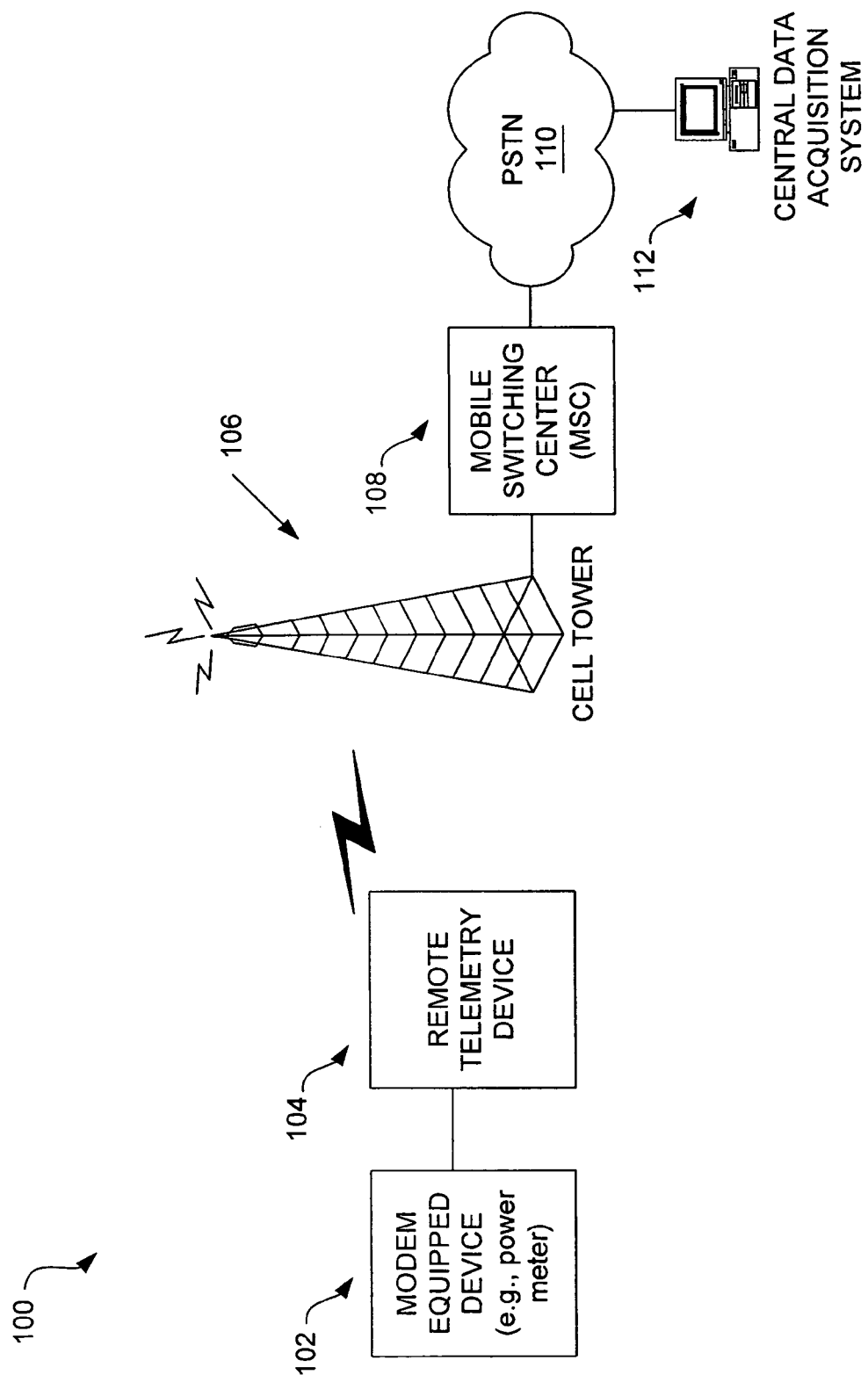
FIG. 1 is a schematic view of an embodiment of a system through which digital data communication is established between the modem equipped device and the data acquisition system.

Referring now in more detail to the figures in which like reference numerals identify corresponding parts, FIG. 1 illustrates an example of a system 100 in which the digital meter data from the modem equipped device (first telemetry device) 102 can be relayed to the central data acquisition system 112 via a remote telemetry device (second telemetry device) 104. The digital meter data may, for example, indicate the amount of consumption of water, power, electric, gas, etc. consumed by the customer over a period of time. As indicated, the system 100 generally comprises one or more modem equipped devices 102, one or more remote telemetry devices 104, one or more cell towers 106, one or more mobile switching centers (MSC) 108, a public switch telephone network (PSTN) 110, and a central data acquisition system 112. As shown in FIG. 1, the modem equipped device 102 is electrically coupled to the remote telemetry device 104. The modem equipped device 102 may include a power meter, gas meter, flow meter, water meter, and other types of measurement devices. A data transmission line (e.g., two-wire line) couples the modem equipped device 102 and the remote telemetry device 104 to facilitate digital data communication.

The remote telemetry device 104 gathers digital data, e.g., utility readings, from the modem equipped device 102. The remote telemetry device 104 relays the digital meter data from the modem equipped device 102 to the central data acquisition system 112. The remote telemetry device 104 may also receive instruction data from the central data acquisition system 112 to transmit digital meter data from the modem equipped device 102. The remote telemetry device can establish a bi-directional communication pathway that relays data between the modem equipped device 102 and the central data acquisition system 112.

The cell tower 106 is part of a cellular network that communicates with the remote telemetry device 104 for the purpose of gathering data from the modem equipped device 102. The cell tower 106 is electrically coupled to the mobile switching center 108 (MSC). The MSC 108 manages cellular calls from and to cellular radios in a given service area. The MSC 108 is coupled to the PSTN 110, which is coupled to the central data acquisition system 112. The cell tower 106, MSC 108 and PSTN 110 facilitate digital data communication between the modem equipped device 102 and the central data acquisition system 112.

Figure 2:
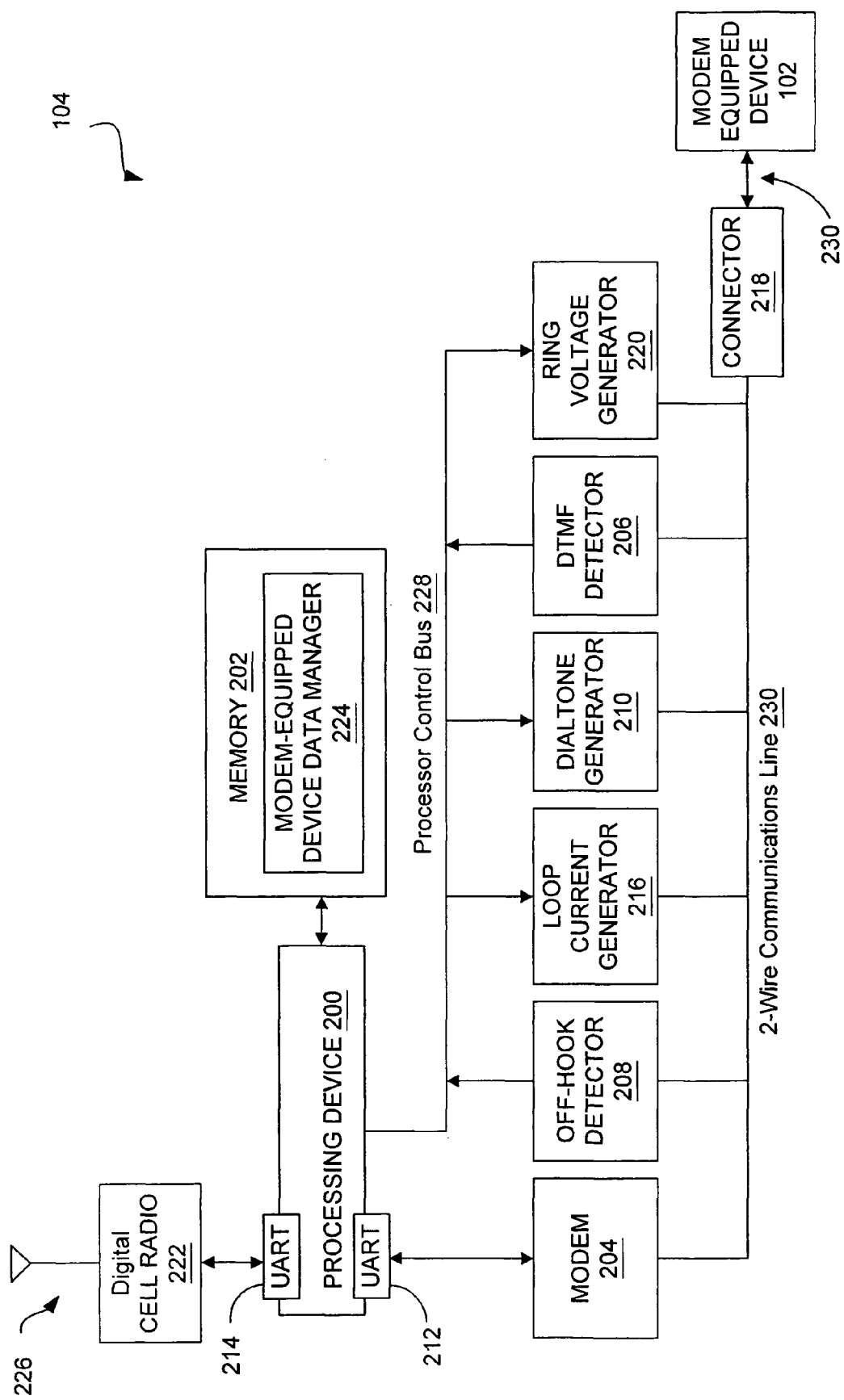
FIG. 2 is a block diagram of an embodiment of a remote telemetry device shown in FIG. 1.

FIG. 2 is a block diagram of the remote telemetry device 104 shown in FIG. 1.

As indicated in FIG. 2, the remote telemetry device 104 has an antenna 226, digital cellular radio 222, processing device 200, and connector 218. The remote telemetry device 104 may further comprise Universal Asynchronous Receiver/Transmitters (UARTs) 212, 214, modem 204, off-hook detector 208, loop current generator 216, memory 202, ring voltage generator 220, a dial tone generator 210 and a dual tone multi-frequency (DTMF) detector 206. The processing device 200 can include any custom made or commercially available processor, a semiconductor base microprocessor (in the form of a micro chip), or a macroprocessor. The memory 202 can include any one or a combination of volatile memory elements (e.g., random access memory (RAM), such as DRAM, SRAM, etc.) and non-volatile memory elements (e.g., ROM, etc.).

The connector (or terminal block) 218 is coupled to the modem equipped device, via a data transmission line, e.g., two-wire communications line 230. In general, the connector 218 is any connection component that links the remote telemetry device 104 to the modem equipped device 102 in order to facilitate digital data communication between the modem equipped device 102 and the central data acquisition system 112. The connector 218 can be a RJ11 or other means of two-wire connection.

The loop current generator 216 is coupled to connector 218 via the two-wire communications line 230 and generates current flow through the two-wire communications line 230 during communication between the remote telemetry device 104 and the modem equipped device 102. The loop current generator 216 generates loop current to the modem equipped device 102. When the device 102 goes off-hook, the loop current begins flowing from the remote telemetry 104 to modem equipped device 102. When the device 102 goes back on-hook, the loop current flow stops.

The off-hook detector 208 is also coupled to connector 218 via the two-wire communications line 230 and detects the loop current generated by the loop current generator 216. By detecting the loop current, the off-hook detector 208 can detect an off-hook condition of the modem equipped device 102 through the two-wire communications line 230 between the remote telemetry device 104 and the modem equipped device 102. When the off-hook detector 208 detects that modem equipped device 102 is off hook, the detector 208 sends a signal to the processing device 200 indicating the off hook condition. The processing device 200 may activate the dial tone generator 210 to generate a dial tone to the modem equipped device 102. The processing device 200 may also send a command to the digital cellular radio 222 to dial a stored number in memory 202.

Also referring to FIG. 2, the ring voltage generator 220 is coupled to the connector 218 via the two-wire communications line 230 and provides a high voltage ring waveform on the data transmission line to the modem equipped device 102. When the modem equipped device 102 detects the ring voltage, the device 102 goes off-hook. This enables communication between the remote telemetry device 104 and the modem equipped device 102 when the central data acquisition system 112 requests the remote telemetry device 104 to transmit digital meter data from the modem equipped device 102.

The connector 218 is coupled to the modem 204 via the two-wire communications line 230 and the modem 204 is coupled to the processing device 200. The modem 204 handshakes with the modem of the modem equipped device 102 and establishes a communication connection between the modem equipped device and the processing device 200. UART 212 may be coupled to the modem 204 and processing device 200 to provide serial communication between the modem 204 and the processing device 200. UART 214 may be coupled to the processing device 200 and the cellular radio 222 to provide serial communication between the cellular radio 222 and the processing device 200.

The cellular radio 222 receives the digital meter data from the processing device 200 and facilitates relaying the digital meter data from the modem equipped device 102 to the central data acquisition system 112. The cellular radio 222 also receives incoming data, e.g., instruction data, from the central data acquisition system 112. The remote telemetry device 104 may relay the instruction data to the modem equipped device 102, which follows the instructions from the central data acquisition system 112.

The remote telemetry device 104 may further comprise a dial tone generator 210 and a dual tone multi-frequency (DTMF) detector 206. Some modem equipped devices 102 may communicate with the remote telemetry device 104 without a dial tone generator 210 and DTMF detector 206.

However, some modem equipped devices 102 require the dial tone generator 210 and DTMF detector 206 to establish communication between the remote telemetry device 104 and the modem equipped device 102. The dial tone generator 210 generates a dial tone to the modem equipped device 102 when the modem equipped device 102 is off-hook. The modem equipped device 102 detects the dial tone and generates a DTMF digit. Once the remote telemetry 104 detects the DTMF digit from the modem equipped device 102, the dial tone generator 210 is turned off.

In one example, the DTMF detector 206 may detect the initial generation of the first DTMF digit and turn off the dial tone generator 210. The modem equipped device 102 may continue to transmit the DTMF digits to the remote telemetry device 104, but the processing device 200 ignores the remaining DTMF digits from the modem equipped device 102. The processing device 200 accesses a dial stored number that is preprogrammed in memory 202 and sends the dial stored number to the digital cellular radio 222 to dial to the cell towers 106.

In another example, the DTMF detector 206 may detect the DTMF digits from the modem equipped device 102. The DTMF digits are sent to the processing device 200, which collects all DTMF digits coming from the modem equipped device 102 and stores the DTMF digits in memory 202. The DTMF digits determine the number to be dialed to the cell tower 106. Once all DTMF digits are collected, the processing device 200 sends the DTMF digits from memory 202 to the digital cellular radio 222 to dial to the cell tower 106.

Once the digital cellular radio 222 establishes the over-the-air cellular link, the processing device 200 activates the modem 204 which handshakes with the modem of the device 102. The processing device 200 then relays the digital meter data via UARTs 214, 212 between the modem equipped device 102 and the central data acquisition system 112. As the modem 204 receives the digital meter data from the modem equipped device 102, UART 212 serially communicates the data to the processing device 200 that relays the digital meter data to UART 214, which in turn serially communicates the data to the digital cellular radio 222 for sending out to the central data acquisition system. Likewise, incoming data, e.g., instruction data, from the central data acquisition system 112 can be relayed to the modem equipped device 102, thereby the remote telemetry device 104 can facilitate a bi-directional communication pathway that relays data between the modem equipped device 102 and the central data acquisition system 112. It should be noted that the processing device 200 does not change or alter the data being relayed to and from the modem equipped device 102.

The bi-directional communication pathway is terminated by either the modem equipped device 102 or the central data acquisition system 112. When the modem equipped device 102 hangs up, the off-hook detector 208 detects an on-hook condition of the modem equipped device 102 and sends a signal to the processing device 200, which indicates a termination of the bidirectional communication pathway. When the central data acquisition system hangs up, the digital radio 222 sends a signal to the processing device 200, which indicates a termination of the bi-directional communication pathway. The modem equipped device 102 and central data acquisition system may also terminate the pathway by timing out or dialing a DTMF digit, such as # or *.

Referring to FIG. 2, it should be noted that modem 204, off-hook detector 208, loop current generator 216, ring voltage generator 222, dial tone generator 210 and DTMF detector 206 are coupled to processing device 200 via the processor control bus 228 such that the processing device 200 communicates with these electrical components and manages their activities. The processing device 200 further manages memory 202, which includes a modem equipped device data manager 224. Operation of the modem equipped device data manager 224 is further described with respect to FIGS. 3, 4, and 5.

The operation of the system described above is shown in flow diagrams, FIGS. 3–5. Any process steps or blocks in these full diagrams may represent modules, segments, or portions of code that include one or more executable instructions for implementing specific logical functions or steps in the process. Although specific process steps are described, alternative implementations are feasible. Moreover, steps may be executed out of order from that shown or discussed, including substantially concurrently or in reverse order, depending on the functionality involved.

Figure 3:
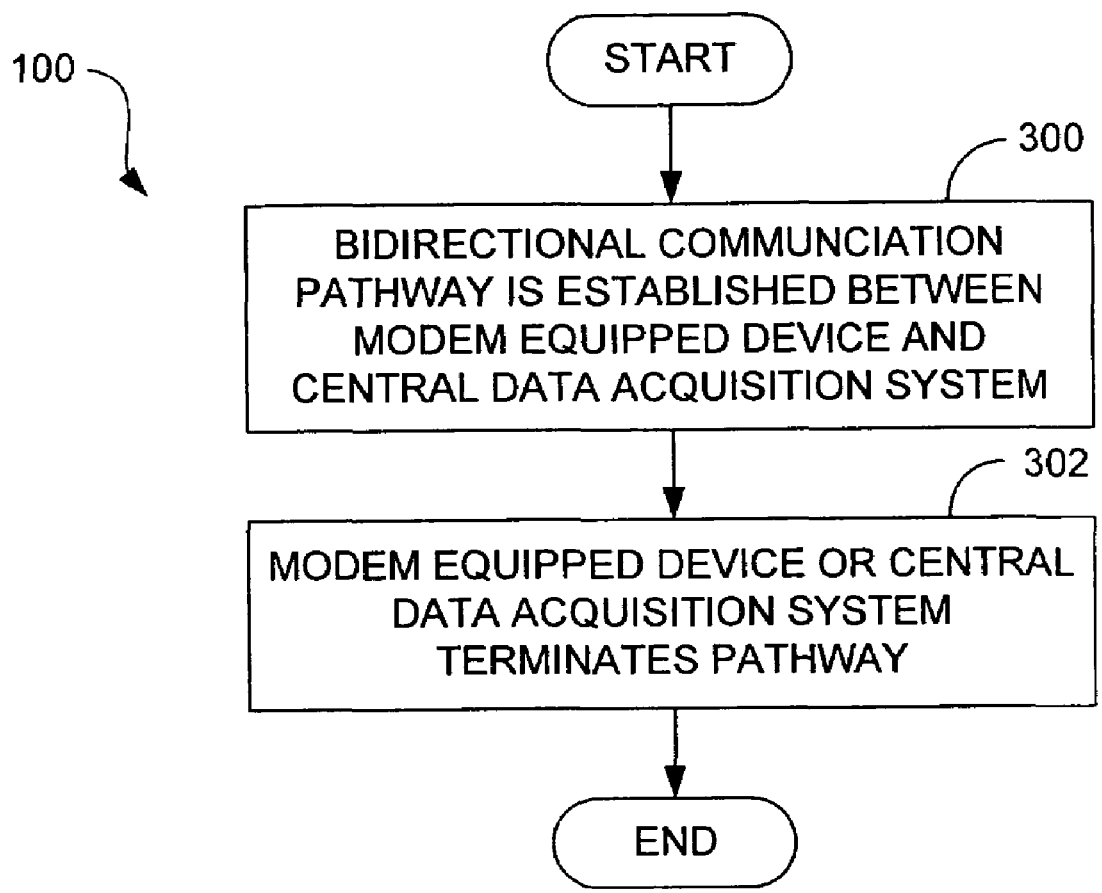
FIG. 3 is a flow diagram that illustrates an embodiment disclosing operation of the system shown in FIG. 1 in facilitating digital data communication between the modem equipped device and the data acquisition system.

FIG. 3 is a high level example of operation of the system 100 of FIG. 1 in facilitating digital communication between the modem equipped device 102 and the central data acquisition system 112. With this system 100, the utility company can relay digital meter data, e.g., utility readings, from the modem equipped device 102 to the central data acquisition system 112 without the use of telephone lines. The system 100 provides a less expensive way of relaying digital meter data from the modem equipped device or meter 102 by using the digital cellular radio 222 of FIG. 2 and the cellular tower 106 of FIG. 1.

Beginning with block 300, the system 100 relays digital meter data from the modem equipped device 102 to the central data acquisition system 112. The digital meter data may represent the amount of consumption of water, power, electric, gas, etc. consumed by the customer. The system 100 may also relay incoming data, e.g., instruction data, from the central data acquisition system 112 to the modem equipped device 102. The system 100 can establish a bi-directional communication pathway that relays data between the modem equipped device 102 and the central control data acquisition system 112, as shown in block 300. The modem equipped device 102 or the central data acquisition system 112 may terminate the communication pathway as shown in block 302. The digital meter data and incoming data are relayed, not changed or altered, between the remote telemetry device 102 and the central data acquisition system 112. Generally speaking, the central data acquisition system 112 receives the digital meter data when the modem equipped device is programmed to send the data at a certain time, e.g., hourly, daily, weekly, monthly, or upon an event, such as fault conditions, power outages, etc., or when the central data acquisition system 112 requests the digital meter data from the modem equipped device 102.

Figure 4A:
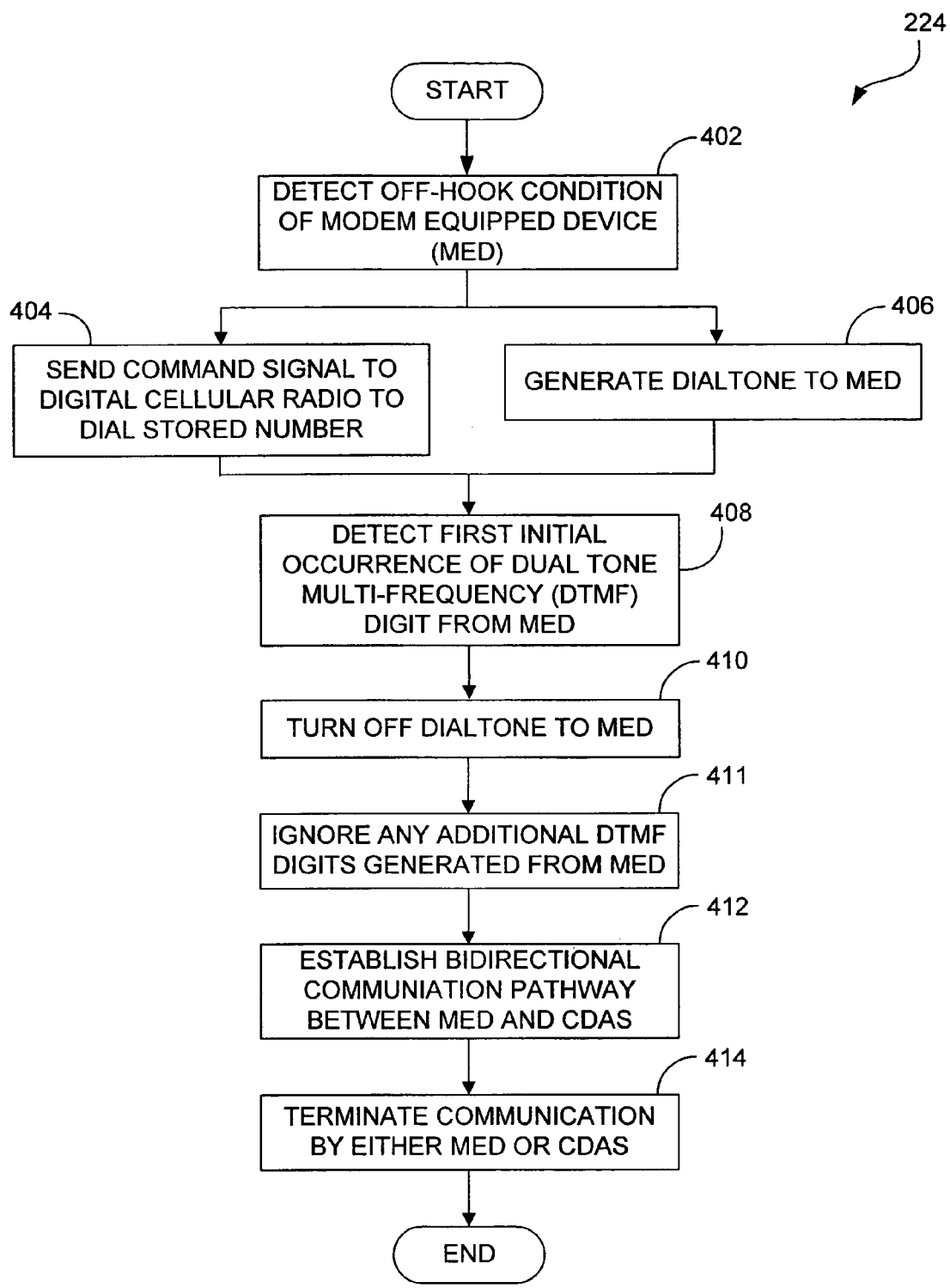
FIG. 4A is a flow diagram that illustrates an embodiment of operation of the modem equipped device data manager of the remote telemetry device shown in FIG. 2.

FIG. 4A illustrates an example of operation of a modem equipped device data manager 224 that facilitates digital data communication between the modem equipped device 102 and the central data acquisition system 112. The manager 224 is programmed to detect an off-hook condition of the modem equipped device 102, as shown in block 402 of FIG. 4A. Once the off-hook condition is detected, the manager 224 may send a command signal to the digital cellular radio 222 to dial stored number to the cell tower 106, as shown in block 404. The manager 224 further may instruct the dial tone generator 210 to generate a dial tone to the modem equipped device 102, as shown in block 406.

When the modem-equipped device 102 receives the dial tone from the remote telemetry device 204, the device 102 may generate the DTMF digits to the device 104. The manager 224 may detect only the initial generation of the first DTMF digit or the first initial occurrence of DTMF digit from the modem equipped device 102, as shown in block 408. The manager 224 may also turn off the dial tone generator 210, as shown in block 410. The modem equipped device 102 may continue to dial the DTMF digit to the remote telemetry device 104, but the manager 224 ignores the remaining DTMF digits from the modem equipped device 102, as shown in block 411.

It should be noted that if the modem equipped device 102 does not require receiving a dial tone or generating DTMF digits, the remote telemetry device 104 bypasses generating a dial tone or receiving DTMF digits and dials the dial stored number to the cell tower 106. Whether or not the dial tone or DTMF digits are generated or received, respectively, the communication between the modem equipped device 102 and the remote telemetry device 104 further includes the modem 204 of the remote telemetry device 104 to handshake with the modem of the device 102.

Once the handshake between the modem equipped device 102 and the remote telemetry device 104 occurs, the manager 224 can establish a bi-directional communication pathway that relays data between the modem equipped device 102 and the central data acquisition system 112, as shown in block 412.

When the communication between the modem equipped device 102 or the central data acquisition system 112 is completed, the manager 224 can detect whether the device 102 or the system 112 is terminating the communication pathway by hanging up, timing out, and/or dialing a DTMF digit (e.g., * or #), as shown in block 414. For example, when the modem equipped device 102 hangs up, the off-hook detector 208 detects an on-hook condition of the modem equipped device 102 and sends a signal to the processing device 200, which indicates a termination of the bi-directional communication pathway. When the central data acquisition system 112 hangs up, the digital radio 222 sends a signal to the processing device 200, which indicates a termination of the bi-directional communication pathway.

Figure 4B:
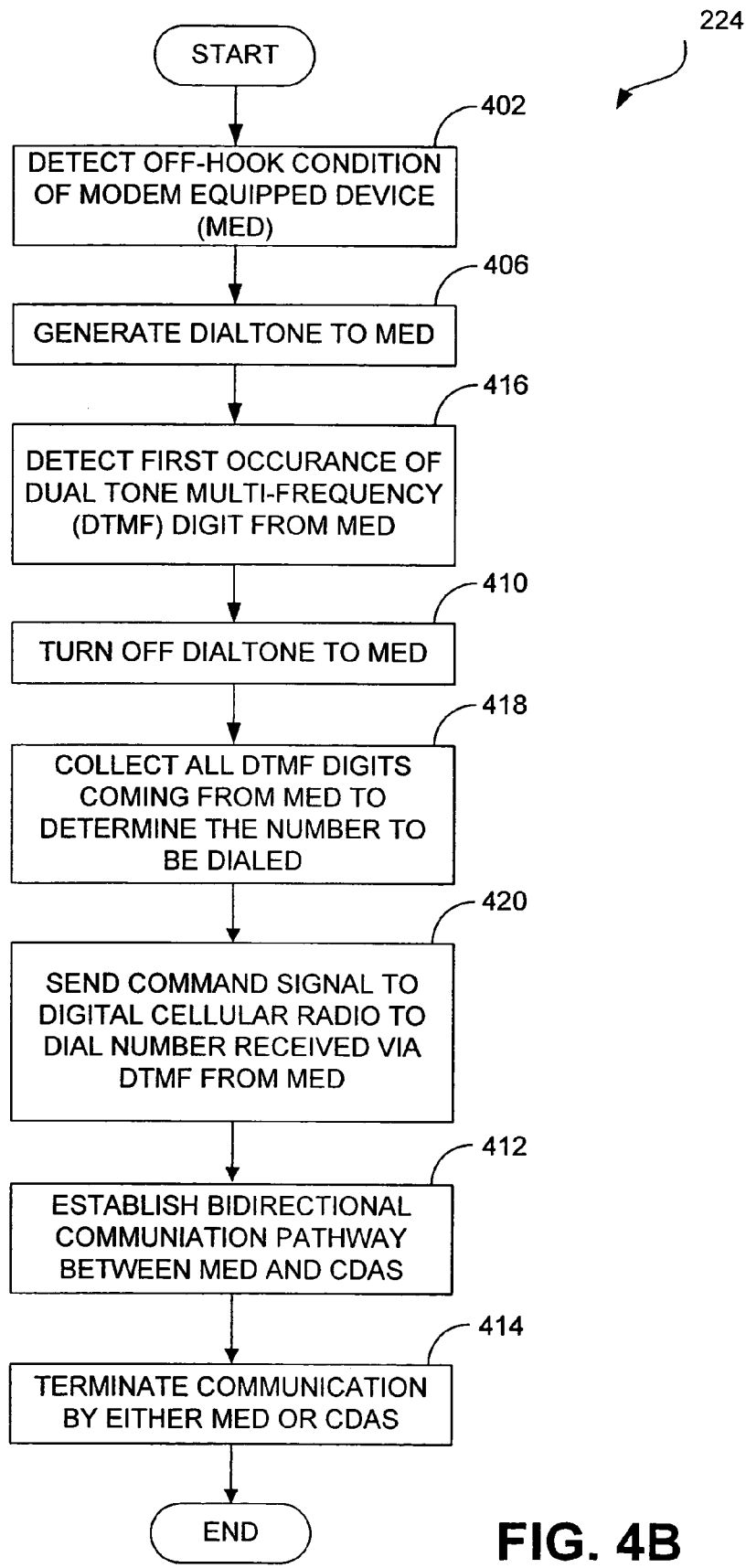
FIG. 4B is a flow diagram that illustrates another embodiment of operation of the modem equipped device data manager of the remote telemetry device shown in FIG. 2.

FIG. 4B is a flow diagram that illustrates another embodiment of operation of the modem equipped device data manager of the remote telemetry device shown in FIG. 2. It should be noted that some of the steps shown in FIG. 4B are similar to the steps in FIG. 4A, e.g., blocks 402, 406, 410, 412, and 414 of FIGS. 4A and 4B. The manager 224 is programmed to detect an off-hook condition of the modem equipped device 102, as shown in block 402. The manager 224 further may instruct the dial tone generator 210 to generate a dial tone to the modem equipped device 102, as shown in block 406.

When the modem-equipped device 102 receives the dial tone from the remote telemetry device 204, the device 102 may generate the DTMF digits to the device 104.

In block 416, the manager 224 may detect the first occurrence of the DTMF digit from the modem equipped device 102. The manager 224 may also turn off the dial tone generator 210, as shown in block 410. The modem equipped device 102 may collect all DTMF digit coming from the modem equipped device 102 to determine the number to be dialed, as shown in block 411.

Once all DTMF digits from the modem equipped device 102 are collected and stored in memory 202. The manager 224 may send a command signal to the digital cellular radio 222 to dial the stored number received via DTMF from the modem equipped device 102, as shown in block 420. Thus, the manager 224 instructs the cellular radio 222 to link to the cell tower 106 to establish communication with the central data acquisition system 112.

The communication between the modem equipped device 102 and the remote telemetry device 104 further requires the modem 204 of the remote telemetry device 104 to handshake with the modem of the device 102. Once the handshake between the modem equipped device 102 and the remote telemetry device 104 occurs, the manager 224 can establish a bidirectional communication pathway that relays data between the modem equipped device 102 and the central data acquisition system 112, as shown in block 412.

When the communication between the modem equipped device 102 or the central data acquisition system 112 is completed, the manager 224 can detect whether the device 102 or the system 112 is terminating the communication pathway by hanging up, timing out, and/or dialing a DTMF digit (e.g., * or #), as shown in block 414. For example, when the modem equipped device 102 and the central data acquisition system 112 do not transmit data for a period of time and/or transmit a special DTMF digit (e.g., * or #), the manager 224 detects the idle time of no data transmission and/or the special DTMF digit, the manager 224 turns off the modem 204 and the digital cellular radio 222.

Figure 5:
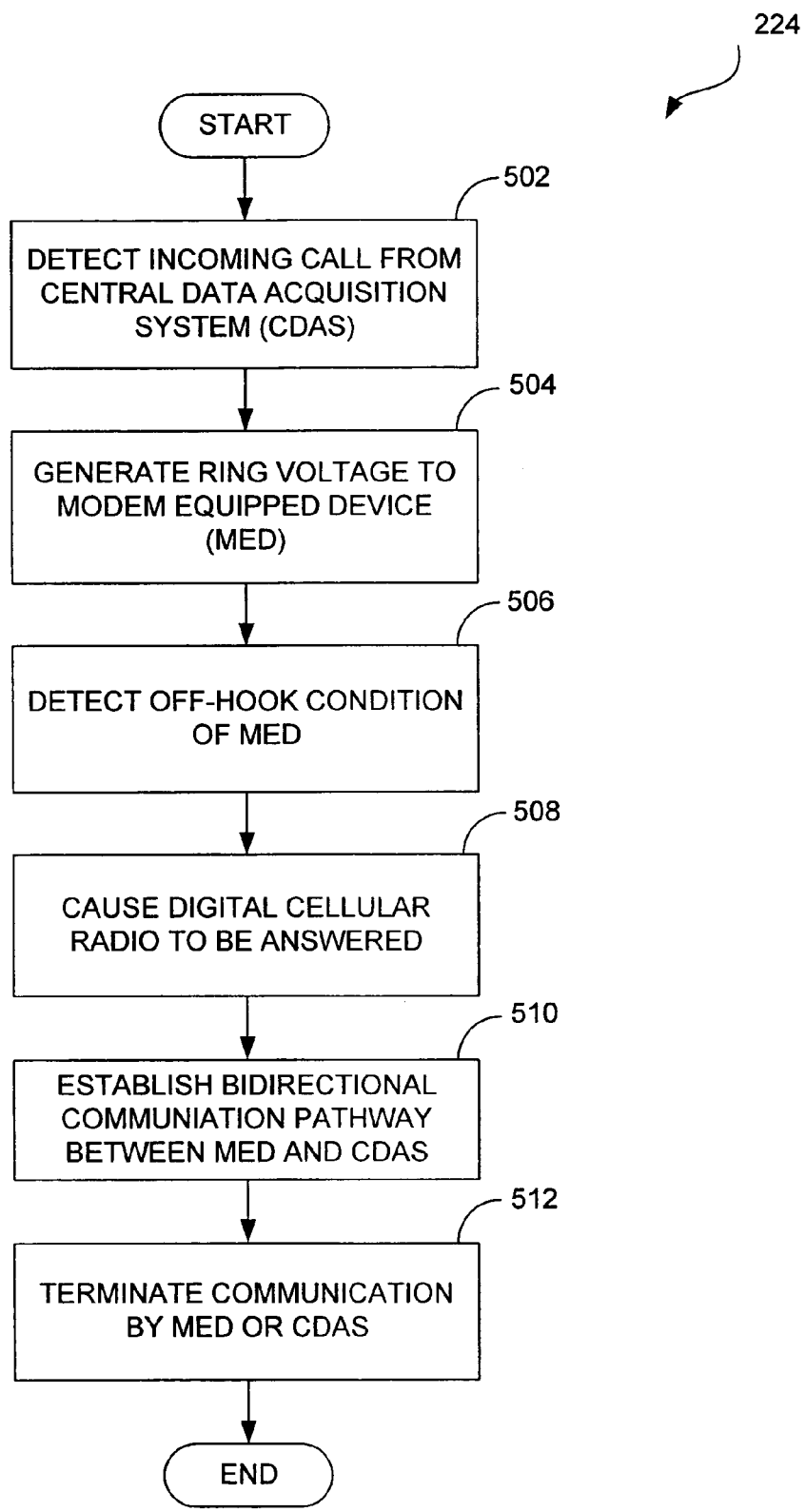
FIG. 5 is a flow diagram that illustrates an embodiment of operation of the modem equipped device data manager of the remote telemetry device shown in FIG. 2 in which the remote telemetry device receives instruction data from a central data acquisition system.

FIG. 5 is a flow diagram that illustrates an embodiment of operation of the modem equipped device data manager 224 of the remote telemetry device 104 shown in FIG. 2 in which the remote telemetry device 104 receives instruction data from a central data acquisition system 112. In FIG. 5, the modem equipped device data manager 224 may detect an incoming call from the central data acquisition system 112 via the digital cellular radio 222, as shown in block 502. The incoming call may comprise instruction data, which is relayed by the processing device 200 to the modem equipped device 102. The manager 224 may generate a ring voltage to the modem equipped device 102, as shown in block 504. When the modem equipped device 102 detects the ring voltage, the modem equipped device 102 goes off-hook.

In block 506, the manager 224 may detect an off-hook condition of the modem equipped device 102. In block 508, the manager 224 may cause the digital cellular radio 222 to answer the incoming call from the central data acquisition system 112. The manager 224 may instruct the modem 204 of the remote telemetry device 104 to handshake with the modem of the device 102. Once the handshake between the modem equipped device 102 and the remote telemetry device 104 occurs, the manager 224 can establish a bidirectional communication pathway that relays data between the modem equipped device 102 and the central data acquisition system 112, as shown in block 510.

In block 512, the manager 224 can detect whether the device 102 or the system 112 is terminating the communication pathway by hanging up, timing out, and/or dialing a DTMF digit (e.g., * or #). For example, when the modem equipped device 102 and the central data acquisition system 112 do not transmit data for a period of time and/or transmit a special DTMF digit (e.g., * or #), the manager 224 detects the idle time of no data transmission and/or the special DTMF digit, the manager 224 turns off the modem 204 and the digital cellular radio 222.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A telemetry digital data communication system comprising:
   a central data acquisition system;
   a first telemetry device that utilizes a modem for data communication, and
   a second telemetry device;
   a two-wire data transmission line between the first telemetry device and the second telemetry device;
   wherein the second telemetry device comprises:
      a processor for communicating with the first telemetry device;
      a modem for facilitating the processor to communicate the digital meter data from the first telemetry device to the digital cellular radio;
      a ring voltage generator for enabling communication with the first telemetry device;
      a loop current generator to maintain current flow through the two-wire line when the second telemetry device communicates with the first telemetry device;
      an off-hook detector to determine whether the first telemetry device is in an off-hook condition;
      a dial tone generator to generate a dial tone to the first telemetry device;
      a dual tone multi-frequency (DTMF) digit detector to determine whether a DTMF digit was transmitted by the first telemetry device; and
      a digital cellular radio for communicating with the processor and the central data acquisition system;
      wherein the processor facilitates relaying digital meter data from the first telemetry device to the digital cellular radio in which the digital cellular radio facilitates transmitting the digital meter data to the central data acquisition system;
   wherein the digital cellular radio is capable of receiving instruction data from the central data acquisition system to transmit digital meter data from the first telemetry device, and sending the instruction data to the processor for relaying the instruction data and communicating with the first telemetry device over the data communication line to transmit the digital meter data from the first telemetry device which then transmits the data to the central data acquisition system.

2. A telemetry digital data communication system comprising:
   a central data acquisition system;
   at least one first telemetry device that utilizes a modem for data communication;
   a second telemetry device for at least one first telemetry device comprising:
      a processor for communicating with the first telemetry device;
      a digital cellular radio for communicating with the processor and the central data acquisition system;
      a ring voltage generator for enabling communication with the first telemetry device;
      a loop current generator to maintain current flow through the two-wire data transmission line when the second telemetry device communicates with the first telemetry device; and
      an off-hook detector to determine whether the first telemetry device is in an off-hook condition;
      a two-wire communications line between the first telemetry device and processor;
   wherein the processor relays digital meter data from the first telemetry device to the digital cellular radio in which the digital cellular radio facilitates transmitting the digital meter data to the central data acquisition system.

3. A data generation and aeclusition system comprising:
   a central data acquisition system;
   at least one first telemetry device; and
   a second telemetry device for at least one first telemetry device comprising:
      a processor for communicating with the first telemetry device, and
      a digital cellular radio for communicating with the processor and the central data acquisition system;
      a ring voltage generator for enabling communication with the first telemetry device;
      a loop current generator to maintain current flow through the two-wire communications line when the remote telemetry device communicates with the first telemetry device; and
      an off-hook detector to determine whether the first telemetry device line is in an off-hook condition;
   wherein the digital cellular radio receives instruction data from the central data acquisition system to transmit digital meter data from the first telemetry device, the digital cellular radio sends the instruction data to the processor, wherein the processor relays the instruction data and communicates with the first telemetry device over the data communication line to transmit the digital meter data from the first telemetry device which then transmits the data to the central data acquisition system.

4. A remote telemetry device for facilitating digital communication between a modem equipped meter and a central data acquisition system, the remote telemetry device comprising:
   a processor for communicating with the modem of the meter;
   a digital cellular radio for communicating with the processor and the central data acquisition device;
   a two-wire communications line between the modem equipped meter and processor;
   a modem for facilitating the processor to communicate the digital meter data from the modem equipped meter to the cellular radio;
   a ring voltage generator for enabling communication with the modem equipped meter;
   a loop current generator to maintain current flow through the two-wire data transmission line when the remote telemetry device communicates with the modem equipped meter;
   an off-hook detector to determine whether the modem equipped meter is in an off-hook condition;
   a dial tone generator to generate a dial tone to the modem equipped meter; and
   a dual tone multi-frequency (DTMF) digit detector to determine whether a DTMF digit was transmitted by the modem equipped meter;
   wherein the processor relays the digital meter data from the modem of the meter to the cellular radio in which the digital cellular radio facilitates transmitting the digital meter data to the central data acquisition system;
   wherein the cellular radio receives instruction data from the central data acquisition system to transmit the digital meter data from the modem equipped meter, the cellular radio sending the instruction data to the processor, wherein the processor relays the instruction data and communicates with the modem equipped meter to transmit the digital meter data from the modem equipped meter.

5. A remote telemetry device for facilitating digital communication between a modem equipped meter and a central data acquisition system, the remote telemetry device comprising:
   a processor for communicating with the modem of the meter; and
   a digital cellular radio for communicating with the processor and the central data acqiuisition device;
   a ring voltage generator for enabling communication with the modem equipped meter;
   a two-wire data transmission line between the modem equipped meter and processor;
   a loop current generator to maintain current flow through the two-wire data transmission line when the remote telemetry device communicates with the modem equipped meter; and
   an off-hook detector to determine whether the modem equipped meter is in an off-hook condition;
   wherein the processor relays the digital meter data from the modem of the meter to the cellular radio in which the digital cellular radio facilitates transmitting the digital meter data to the central data acquisition system.

6. A remote telemetry device for facilitating digital communication between a modem equipped meter and a central data acquisition system, the remote telemetry device comprising:
   a processor for communicating with the modem of the meter; and
   a cellular radio for conmiunicating with the processor;
   a ring voltage generator for enabling communication with the modem equipped meter;
   a two-wire data transmission line between the modem equipped meter and processor;
   a loop current generator to maintain current flow through the two-wire line when the remote telemetry device communicates with the modem equipped meter; and
   an off-hook detector to determine whether the modem equipped meter is in an off-hook condition;
   wherein the cellular radio receives instruction data from the central data acquisition system to transmit the digital meter data from the modem equipped meter, the cellular radio sending the instruction data to the processor, wherein the processor relays the instruction data and communicates with the modem equipped meter to transmit the digital meter data from the modem equipped meter.

7. A method for facilitating digital communication between a modem equipped meter and a central data acquisition system, the method comprising the steps of:
   detecting incoming calls from the central data acquisition system;
   generating ring voltage to the modem equipped meter;
   generating a dial tone to the modem equipped device;
   detecting whether the modem equipped meter is off hook;
   detecting dual tone multi frequency (DTMF) from the modem equipped meter;
   dialing a digital cellular radio for communicating with the central data acquisition system;
   receiving instruction data from the central data acquisition system for transmitting data from the modem equipped meter;
   establishing a bi-directional communication pathway that relays data between the modem equipped meter and the central data acquisition system, and terminating the pathway.

8. A method for facilitating digital communication between a modem equipped meter and a central data acquisition system, the method comprising the steps of:
   detecting whether the modem equipped meter is off hook;
   establishing a bi-directional communication pathway that relays data between the modem equipped meter and the central data acquisition system;
   detecting incoming calls from the central data acquisition system;
   generating ring voltage to the modem equipped meter;
   causing a digital cellular radio to answer the incoming calls; and
   terminating the pathway.

* * * * *